Patented Dec. 15, 1925.

1,565,779

UNITED STATES PATENT OFFICE.

JOHN BIRD, OF CAMDEN, MAINE.

COMPOSITION FOR REMOVING CARBON DEPOSITS.      REISSUED

No Drawing.      Application filed June 4, 1925.   Serial No. 35,025.

*To all whom it may concern:*

Be it known that I, JOHN BIRD, a citizen of the United States, residing at Camden, in the county of Knox and State of Maine, have invented certain new and useful Improvements in Compositions for Removing Carbon Deposits; and I do hereby declare the following to be a full, clear, and exact description of the invention, such as will enable others skilled in the art to which it appertains to make and use the same.

This invention relates to an improved composition for removing or cutting out ordinary carbon deposits commonly formed in internal combustion engines or the like, this means consists of a composition comprising ammonium carbonate and powdered napthalene pressed into tablet form, the tablet being particularly adapted for use in a carbon removing attachment for internal combustion engines, and so arranged that air will be drawn through the attachment and over the chemical so that the fumes of the chemical will remove the carbon from the engines, and prevent further formation of carbon deposits therein.

An object of this application is to provide a composition in tablet form, comprised principally of a mixture of ammonium carbonate and napthalene, the proportions of these two chemicals to vary depending upon the strength of the composition desired, for example, under usual circumstances; the proportions would be 12½% (twelve and one-half percent) ammonium carbonate and 87½% (eighty seven and one-half percent), powdered napthalene, together with some coloring matter in a proportion of about one tenth of one percent, forming a powder which is pressed into tablet form, variations of the proportions used of the ammonium carbonate and powdered napthalene is understood not to affect the merits of this invention.

The fumes passing off from the tablets uniting with the gas mixture going into the combustion chamber in the motor, will retard combustion and burn up any carbon formations, the ash passing off with the exhaust. By experiment it has been found that this tablet will overcome carbon "knocks" and will remove carbon when sufficient fumes are passed into the motor, no matter what the size of the cylinder may be or what amount of carbon may be there.

When in operative position this composition and invention will result in the first instance to insulate any carbon deposits that may be in the motor by burning the deposits or carbon, forming an ash on top which stops pre-igniting and "knocking," then it gradually works on the carbon until it is removed, unless the motor is gathering carbon faster than the volume of fumes going through will handle. The fumes will retard combustion resulting in a slower burning of the gases, and also increase the temperature of the explosion, which in turn increases the temperature of the walls of the combustion chamber in the motor, the fumes will furthermore, act to burn up into ash all hydrocarbon, vegetable and animal deposits in the mixture. The fumes passing off from the tablet are taken up by the air which rushes through the container and past the tablet, the rush of air being caused ordinarily by the vacuum in the motor.

What I claim is:

1. A composition in the form of a tablet consisting of ammonium carbonate and powdered napthalene.

2. A composition consisting of ammonium carbonate and powdered napthalene.

In testimony whereof I affix my signature.

JOHN BIRD.